Jan. 15, 1963  E. A. MEYER  3,073,368
SHEET METAL FASTENER WITH AN ANGULARLY ORIENTED
SCREW RECEIVING BODY PORTION
Filed Dec. 10, 1958  3 Sheets-Sheet 1
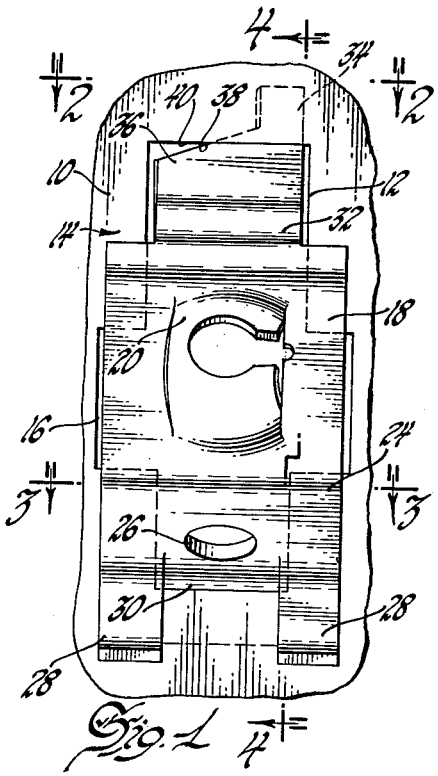
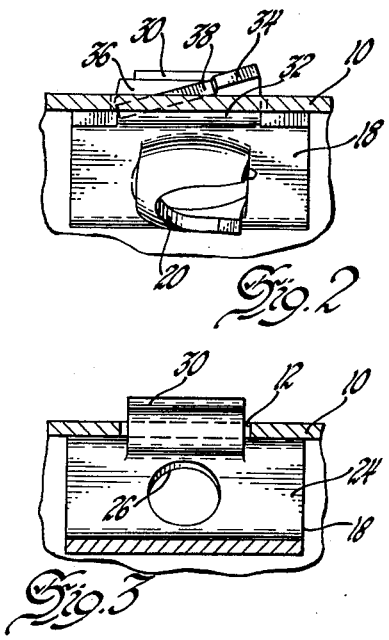
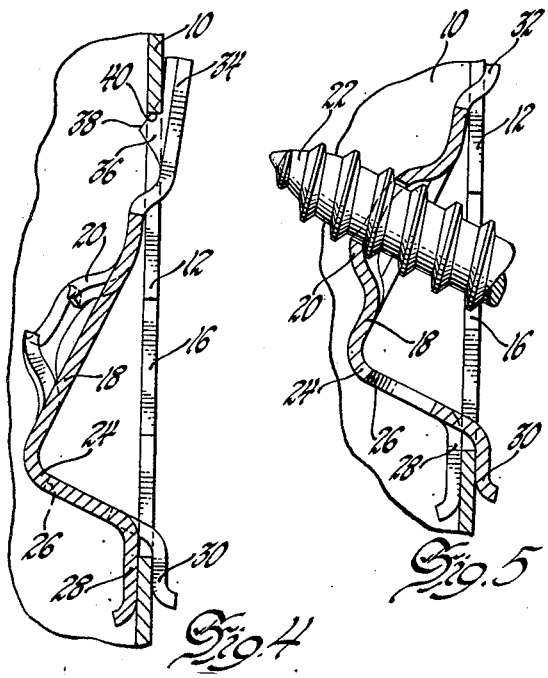
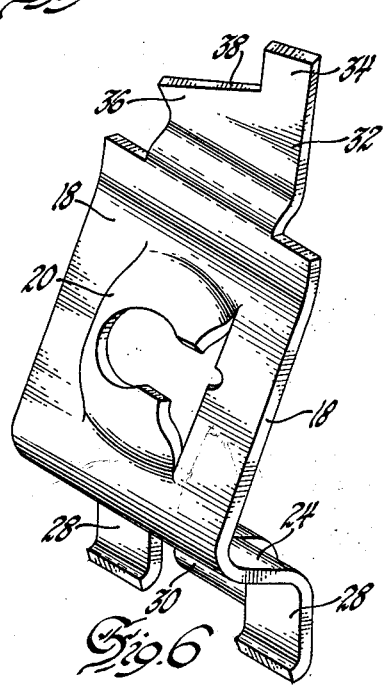
INVENTOR.
Engelbert A. Meyer
BY
L. D. Burch
ATTORNEY Jan. 15, 1963 E. A. MEYER 3,073,368
SHEET METAL FASTENER WITH AN ANGULARLY ORIENTED
SCREW RECEIVING BODY PORTION
Filed Dec. 10, 1958 3 Sheets-Sheet 2
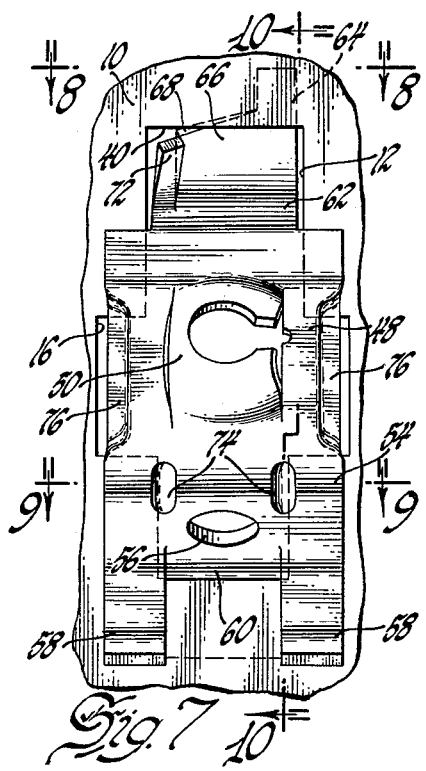
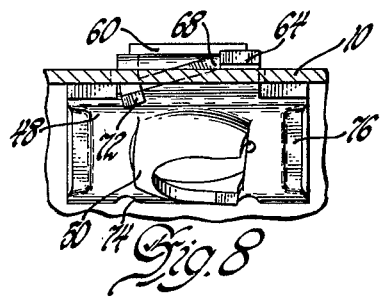
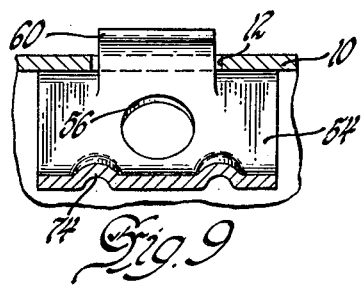
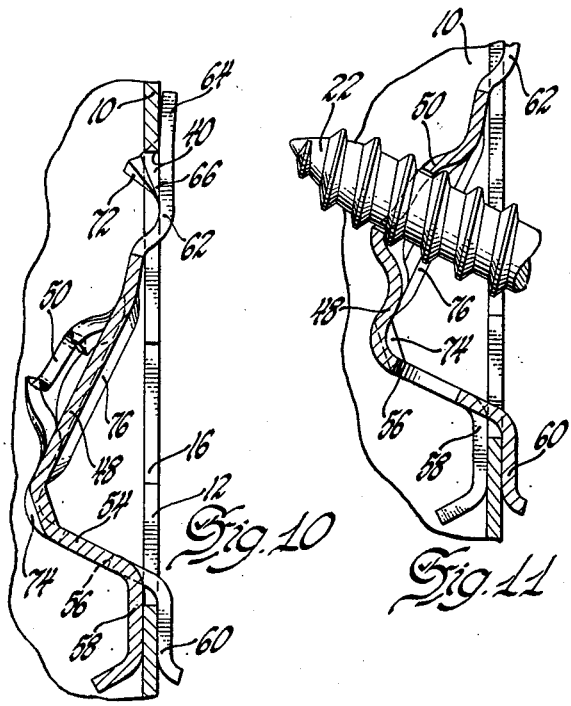
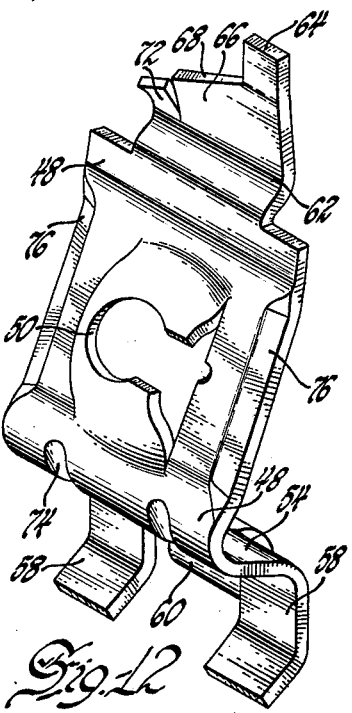
INVENTOR.
Engelbert A. Meyer
BY
L.D. Burch
ATTORNEY

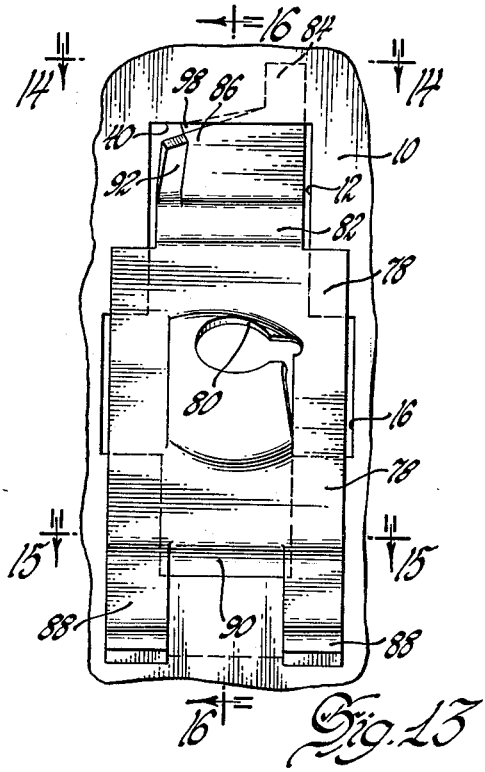
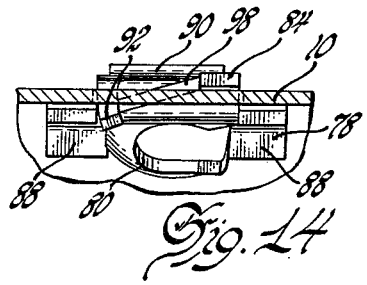
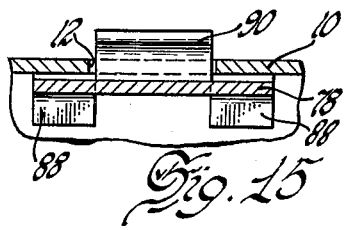
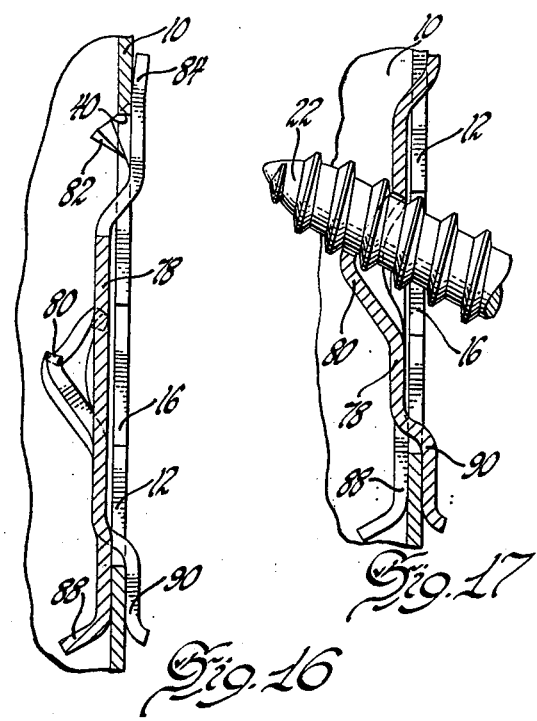
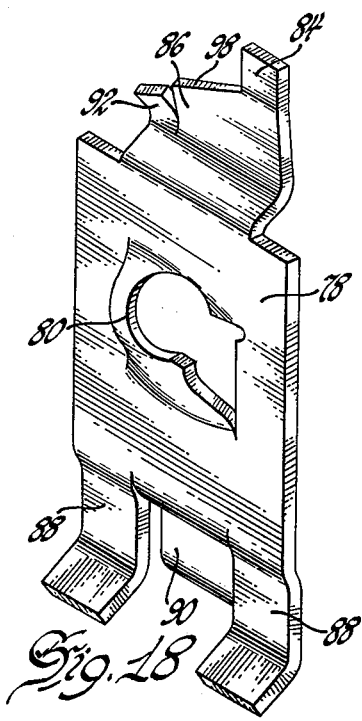

United States Patent Office 3,073,368
Patented Jan. 15, 1963

3,073,368
SHEET METAL FASTENER WITH AN ANGULARLY ORIENTED SCREW RECEIVING BODY PORTION
Engelbert A. Meyer, Detroit, Mich., assignor to General Motors Corporation, Detroit, Mich., a corporation of Delaware
Filed Dec. 10, 1958, Ser. No. 779,332
2 Claims. (Cl. 151—41.75)

This invention relates to fasteners and more particularly to a fastening device receivable in an opening in a supporting plate to fasten a bolt angularly disposed with respect to said supporting plate.

In products comprising a number of connected parts, such as a motor vehicle, a great variety of specially designed fasteners are required in order to secure the parts together, and particularly where the parts are oddly shaped or angularly abutting. It may also be desirable, in such products, to hide the fastening devices from the view of the users of the products and to prevent unsightly fasteners from destroying the esthetic appeal of such products. Due to the rigid changing of motor vehicle design from year to year, problems continuously arise in design and assembly as to proper structural connections for the various parts without disturbing the eye-appeal of the overall construction.

In those instances where a part must be secured to a support by a bolt, or the like, and the bolt approaches the supporting plate from an angular direction, it has been extremely difficult to obtain an economical and proper structural connection. For example, a motor vehicle arm rest must be secured to the door panel in such a way that the attaching bolts are out of sight of the operator or passenger. This may be accomplished by passing the bolts throught the lower part of the arm rest, but in order to obtain a structurally good connection, the bolts must extend upwardly and angularly with respect to the door panel.

A further difficulty is the inaccessibility of the interior of the panel at the time the part, such as the arm rest, is attached. Thus, it is necessary to have a fastening device that may be secured to the supporting panel before assembly thereof and to remain with the panel until the arm rest is attached.

It is here proposed to provide a fastener device which overcomes the above-mentioned difficulties. The fastener comprises, generally, a body portion angularly disposed with respect to the supporting panel and retained in the panel by a plurality of legs and tabs extending from the body portion. The attaching bolt may be received from an angular direction with respect to the supporting panel, and the fastener retained in the panel during prior assembly operations. The fastener is properly, and relatively rigidly, located in the panel by the tabs and legs so that the assembler securing the part of the panel need only insert the attaching bolts from the outside and tighten them down.

These and other features of the invention will be apparent from the following description and the attached drawings in which:

FIGURE 1 is an elevational view of a portion of a supporting plate with the fastener device mounted thereon;

FIGURE 2 is an end view of the fastener shown in FIGURE 1 taken substantially along the line 2—2 of FIGURE 1 and looking in the direction of the arrows;

FIGURE 3 is a cross-sectional view of the device of FIGURE 1 taken substantially along the line 3—3 and looking in the direction of the arrows;

FIGURE 4 is a cross sectional view of the device shown in FIGURE 1 taken substantially along the line 4—4 and looking in the direction of the arrows;

FIGURE 5 is an enlarged view of a portion of FIGURE 4 showing the attaching bolt secured in the fastener device;

FIGURE 6 is a perspective view of the fastener shown in FIGURE 1;

FIGURE 7 is an elevational view of a modification of the device shown in FIGURE 1;

FIGURE 8 is an end view of the fastener device shown in FIGURE 7 taken substantially along the lines 8—8 of FIGURE 7 and looking in the direction of the arrows;

FIGURE 9 is a cross-sectional view of the fastener shown in FIGURE 7 taken substantially along the line 9—9 and looking in the direction of the arrows;

FIGURE 10 is a cross-sectional view of the fastener shown in FIGURE 1 taken substantially along the line 10—10 and looking in the direction of the arrows;

FIGURE 11 is a view of a portion of the fastener shown in FIGURE 7 with parts broken away and in section to illustrate the attaching bolt received in the fastener of FIGURE 7;

FIGURE 12 is a perspective view of the fastener shown in FIGURE 7;

FIGURE 13 is an elevational view of a second modification of the fastener device shown secured in a supporting plate;

FIGURE 14 is an end view of the fastener device shown in FIGURE 13 taken substantially along the line 14—14 of FIGURE 13 and looking in the direction of the arrows;

FIGURE 15 is a cross-sectional view of the modification shown in FIGURE 13 taken substantially along the line 15—15 and looking in the direction of the arrows;

FIGURE 16 is a cross-sectional view of the fastener device shown in FIGURE 13 taken substantially along the line 16—16 of FIGURE 13 and looking in the direction of the arrows;

FIGURE 17 is a view of a portion of the fastener shown in FIGURE 13 with parts broken away and in section to illustrate the means of attaching the bolt to the fastener device, and FIGURE 18 is a perspective view of the modification shown in FIGURE 13.

Referring more particularly to the drawings, FIGURES 1 through 6 illustrate a modification of the fastener device embodying this invention. A supporting plate 10 which may be a door panel or the like, has a rectangular opening 12 formed therein to receive the fastener, illustrated generally by the numeral 14. A second rectangular opening 16 transversely disposed with respect to the opening 12, intersects the opening 12 to provide a final cross shaped aperture in the supporting plate 10.

The clip 14 has a generally rectangular body portion 18 which is of a width greater than the width of the rectangular opening 12. A bolt receiving impression 20 is provided centrally in the body portion 18 to receive a screw or bolt 22, as shown in FIGURE 5. The body portion 18, when the fastener mounted on the supporting plate 10 is angularly disposed with respect to the supporting plate, is best shown in FIGURES 4 and 5.

An intermediate portion 24 is formed from the body portion 18, extends toward the supporting plate 10 and is substantially normally to the body portion 18. An aperture 26 in the intermediate portion allows for the insertion of a tool which may be used to mount the fastener in the openings 12 and 16.

A pair of lower tabs, or legs, 28 are formed from the intermediate portion 24 and extend substantially parallel to the supporting plate 10. The legs 28 are disposed on the same side of the supporting plate as the body portion 18 and the intermediate portion 24. A third tab, or leg, 30 is also formed from the intermediate portion 24 and between the legs 28. The tab 30 extends substantially parallel to the supporting plate 10 and on the opposite side of the supporting plate from the legs 28. It may thus be seen that the legs 28 and tab 30 straddle the supporting plate to aid in retaining the fastener 14 in the opening 12 in the plate 10.

An upper portion 32 extends from the body portion 18 and terminates in an upper tab 34 passing through the opening 12, and abutting the opposite side of the plate 10 from the body portion 18. A part 36 of the upper portion 32 is twisted out of the plane of the upper portion 32 and toward the body portion 18 of the fastener to form an inclined surface. FIGURE 4 shows the free position of the fastener 14, and it may be seen that the upper edge 38 of the twisted part 36 will bear against the edge 40 of the opening 12 in the supporting plate 10.

When the clip is mounted in the opening in the supporting plate it is obvious that the lower legs and tab, 28 and 30, retain the lower portion of the clip on the supporting plate and the twisted part 36 and the bearing edge 38 secure the clip in the opening to retain the clip during assembly process. Referring to FIGURES 1 and 5, when the attaching bolt 22 is inserted in the impression 20 and tightened down, the rectangular body portion 18 bears against the supporting plate 10, preventing the clip from being pulled through the opening 12. The attached part is then rigidly secured.

The fastener may be inserted in the supporting plate through the use of a suitable tool inserted in the opening 26 in the intermediate portion 24. The upper portion inserted in the opening 12 and the clip is raised far enough for the legs 28 and the tab 30 to straddle the plate 10. The fastener is then moved downwardly to engage the edge 38 of the twisted upper portion and the upper edge 40 of the opening 12.

The modification shown in FIGURES 7 through 12 may be mounted in a supporting plate 10 having similar openings 12 and 16. The rectangular body portion 48 has a similar bolt receiving impression 50 formed therein. As shown in FIGURE 11, the clip is secured to the supporting plate 10 in such a manner that the body portion 48 is angularly disposed with respect to the plate 10 to receive the attaching bolt or screw 22.

An intermediate portion 54 extends from the body portion 48 and substantially normally thereto toward the supporting plate 10. An aperture 56 in the intermediate portion 54 allows for the insertion of the mounting tool.

A pair of legs 58 and a tab 60 are similarly formed from the intermediate portion 54 and extend substantially parallel and on opposite sides of the supporting plate 10. It may be seen that the legs 58 and tab 60 secure the lower portion of the fastener to the plate 10.

An upper portion 62 is formed from the body portion 48 and extends through the opening 12 in the plate 10. The upper portion terminates in a tab 64 extending on the opposite side of the plate 10 from the body portion 48 to prevent removal of the fastener in a direction to the left, as viewed in FIGURE 10. A part 66 of the upper portion 62 is twisted out of the plate of the upper portion 64 toward the body portion 48 such that the upper edge 68 forms an inclined surface and engages the upper edge 40 of the opening 12. The fastener is shown in its free position in FIGURE 10, illustrating the biasing action. A second tab 72 is formed from the upper portion 62 and is adapted to abut the edge 40 of the opening 12 to prevent vertical movement of the fastener of the plate 10.

A pair of detents 74 are formed in the angle between the body portion 48, and the intermediate portion 54, and the edges 76 of the body portion 48 are formed out of the plane of the body portion, in order to strengthen the clip.

The fastener is inserted in the opening 12 in the same manner as the modification shown in FIGURE 1 with the further advantage that the second tab 72 prevents vertical movement of the fastener in the opening 12 of the plate 10.

The modification shown in FIGURES 13 through 18 is similar to that shown in FIGURES 7 through 12 with the exception of the position of the body portion of the clip. In the modification of FIGURE 13 the body portion 78 is substantially parallel to the supporting plate 10 with the bolt receiving impression 80 being angularly disposed with respect to the body portion to receive the bolt or screw 27.

Lower legs 88 and tab 90 extend from the body portion 78 and are substantially parallel to the supporting plate 10. The tab 90 is disposed on the opposite side of the supporting plate from the legs 88.

The upper portion 82 extends through the opening 12 on the opposite side of the plate 10 from the body portion, and terminates in a tab 84 which prevents the clip from moving to the left as viewed in FIGURE 16. The part 86 of the upper portion 82 is twisted out of the plane of the upper portion such that the edge 98 forms an inclined surface to bear against the upper edge 40 of the opening 12. The second tab 92 prevents vertical movement of the clip in the supporting plate as described with respect to the modification shown in FIGURE 7.

The fastener is positioned in the opening in the same manner as above described. That is, the upper portion and tabs are inserted in the opening 12 such that the legs 88 and tab 90 will straddle the supporting plate 10. The clip is then moved downwardly until the inclined surface 98 properly engages the edge 40 of the opening 12, the tab 92 preventing vertical movement of the fastener within the plate. The attaching screw or bolt 22 may then be inserted in the impression 80 and, when tightened down, the clip is prevented from passing through the opening by the body portion which is wider than the opening 12.

I claim:

1. A fastening device receivable in an opening in a supporting plate and comprising:
   a body portion greater in width than said opening in said supporting plate and having one end thereof adapted to engage said supporting plate, said body portion having a thread receiving impression formed out of the surface thereof and having an axis normal to said body portion to receive a threaded fastener;
   an intermediate portion extending at an angle from said body portion and toward said supporting plate and spacing the other end of said body portion more distant from said supporting plate than said end of said body portion engaging said supporting plate;
   a pair of legs extending from said intermediate portion in a direction substantially parallel to said supporting plate and adapted to engage one surface of said supporting plate;
   a lower tab member extending from said intermediate portion and between said legs and adapted to extend through said opening in said supporting plate and engage the opposite surface of said supporting plate from said legs;
   and an upper portion extending from said body portion and from the end opposite said intermediate portion, said upper portion being narrower in width than said body portion and said opening and adapted to pass through said opening, said upper portion comprising an edge having a tab extending therefrom, a part of said upper portion including said edge being twisted to position said edge at an acute angle with respect to a longitudinal center line through said body portion and being inclined out of the plane of said upper portion toward said body portion to provide an angular edge for engaging the edge of said opening in said supporting plate and locate said fastening device in said opening and retain said fastening device in said supporting plate.

2. The fastening device set forth in claim 1 and further including edges formed out of the plane of said body portion to strengthen said fastening device.

References Cited in the file of this patent
UNITED STATES PATENTS

| | | |
|---|---|---|
| 1,737,375 | King | Nov. 26, 1929 |
| 2,198,439 | Kost | Apr. 23, 1940 |
| 2,302,389 | Kost | Nov. 17, 1942 |
| 2,552,782 | Hall | May 15, 1951 |
| 2,562,002 | Tinnerman | July 24, 1951 |
| 2,667,200 | Bedford | Jan. 26, 1954 |
| 2,836,216 | Rapata | May 27, 1958 |
| 2,908,311 | Garman | Oct. 13, 1959 |